(12) United States Patent
Engering et al.

(10) Patent No.: US 6,439,764 B1
(45) Date of Patent: Aug. 27, 2002

(54) DEVICE AND PROCESS FOR THERMOGRAPHIC EXAMINATION OF FUNCTIONAL SURFACES OF FORMING TOOLS

(75) Inventors: Gerrit Engering, Ulm; Dirk Hortig, Hattersheim; Michael Lahres, Ulm, all of (DE)

(73) Assignees: DaimlerChrysler AG; Technische Universitat Darmstadt, both of (DE)

( * ) Notice: Subject to any disclaimer, the term of this patent is extended or adjusted under 35 U.S.C. 154(b) by 24 days.

(21) Appl. No.: 09/602,664

(22) Filed: Jun. 16, 2000

(30) Foreign Application Priority Data

Jun. 17, 1999 (DE) .......................................... 199 27 760

(51) Int. Cl.$^7$ ............................................. G01N 25/72
(52) U.S. Cl. ............................................... 374/4; 374/5
(58) Field of Search ........................... 374/4, 5, 120, 374/121, 123, 137; 250/330, 338.1

(56) References Cited

U.S. PATENT DOCUMENTS

| | | | |
|---|---|---|---|
| 3,579,775 A | | 5/1971 | Carlson |
| 3,681,970 A | * | 8/1972 | Wells ............................. 374/5 |
| 4,636,088 A | * | 1/1987 | Rosencwaig et al. ........... 374/5 |
| 5,803,606 A | * | 9/1998 | Petry et al. ..................... 374/5 |
| 5,834,661 A | * | 11/1998 | Nonaka et al. ................. 374/5 |
| 5,859,405 A | | 1/1999 | Gotz et al. |
| 6,019,504 A | * | 2/2000 | Adams ........................... 374/5 |
| 6,142,663 A | * | 11/2000 | Takasuka .................... 374/121 |
| 6,183,126 B1 | * | 2/2001 | Murphy et al. ................. 374/5 |
| 6,183,130 B1 | * | 2/2001 | Adams et al. ............... 374/121 |

FOREIGN PATENT DOCUMENTS

| | | | |
|---|---|---|---|
| DE | 76 602 A | 5/1970 | |
| DE | 42 33 035 C1 | 7/1993 | ........... B23Q/17/09 |
| DE | 44 16 872 A1 | 11/1995 | ........... B23Q/17/09 |
| DE | 197 50 165 C1 | 8/1999 | ........... B30D/15/14 |
| EP | 0 685 297 A1 | 12/1995 | ........... B23Q/17/09 |
| EP | 0 905 492 A2 | 3/1999 | ............. G01J/5/00 |
| JP | 08010873 | 1/1996 | ........... B21D/37/00 |

* cited by examiner

Primary Examiner—Diego Gutierrez
Assistant Examiner—Madeline Gonzalez
(74) Attorney, Agent, or Firm—Pendorf & Cutliff

(57) ABSTRACT

The thermographic examination of functional surfaces of forming tools in the forming process is important for the selection of an optimal tool material or an optimal coating material for a particular forming process and for a particular workpiece composition, and also for the optimization of process parameters of the forming process.

The task of the present invention is comprised therein, to develop a device and a process, which enables the rapid and simple thermographic examination of functional surfaces of forming tools during the forming process.

This task is solved by a process and a device, in which the sought after temperature distribution of the functional surfaces during the forming process are conducted, from point of origin, through a channel, in the direction of a temperature measuring device, via thermal radiation or, in certain cases, thermal conductivity.

21 Claims, 2 Drawing Sheets

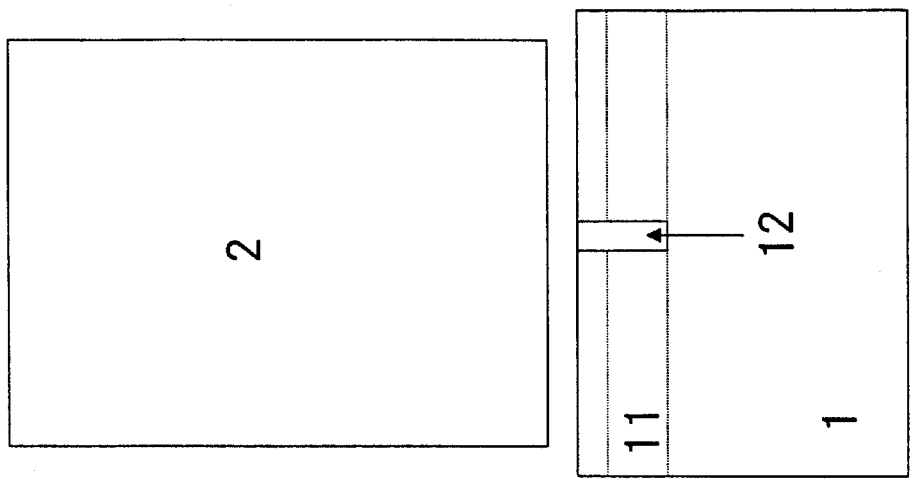
FIG. 1b
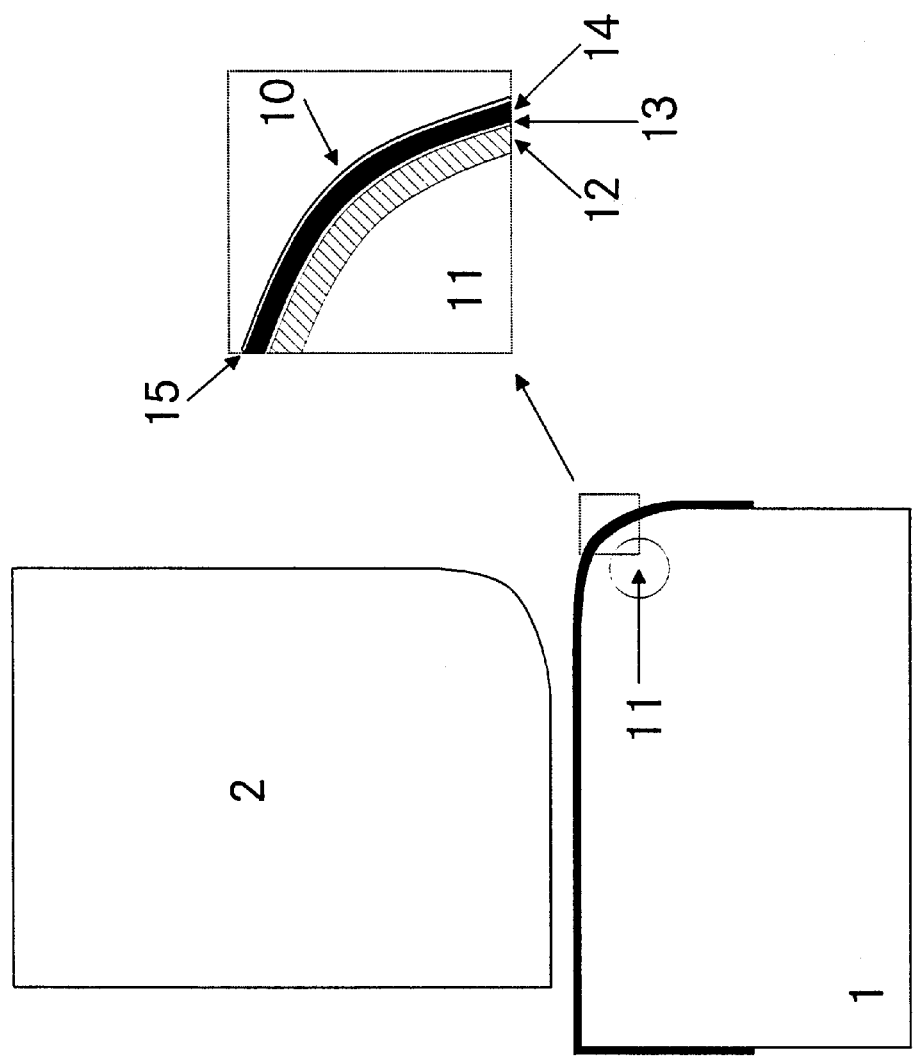
FIG. 1c
FIG. 1a

DEVICE AND PROCESS FOR THERMOGRAPHIC EXAMINATION OF FUNCTIONAL SURFACES OF FORMING TOOLS

The invention concerns a device and a process for rapid and simple thermographic examination of functional surfaces of forming tools according to the pre-characterizing portion of Patent claims 1 and 11. A device for examination of the thermal load of functional surfaces of forming tools is already known from EP 685297 A1.

The optimization of the forming processes and work tools associated therewith is the focus of intensive research and development activity. Of particular interest is measurement of temperature in the work area during the work process. This allows determination in situ of the loading and the friction condition of the work tool. Ever-increasing requirements of work tools dictate higher loads and require more suitable new materials for these work tools. Conventionally, these new materials are applied to the work tools in the form of coatings as in EP 685297 A1. It has been proposed to integrate one (or more) thin film sensors in a functional or wear protective layer of the work tool for determination of the temperature of the wear surface of a forming or machining work tool. This however requires much technical effort and high costs. Besides this, thin film sensors enable temperature measuring only at one point. The determination of the temperature distribution would here be possible only with a multiplicity of sensors, and would require higher technical investment and costs. Besides this, no high dynamic measurement can be accomplished with the integration of a thin film sensor in a work tool.

SUMMARY OF THE INVENTION

The task of the present invention is comprised therein, to provide a device for rapid and simple thermographic examination of functional surfaces in forming tools in situ, which makes possible the determination of the temperature distribution without hindering the work process or the goal of the optimization of the wear and structure relationship of the employed work tool without increasing investment and costs, as well as the development of a process with the same advantages.

With respect to the device to be achieved, the inventive task is preferably inventively solved whereby, that the device for thermographic examination of functional surfaces of forming work tools is designed in such a manner, that it contains a temperature measurement device, that the forming tool in the area of the functional surface contains at least one channel, which respectively exhibits one opening facing the work piece, and into which thermal radiation emitted from the functional surface to be examined is conducted, whereby the thermal radiation conducted through a channel is detectable at least indirectly by the temperature measuring device, so that the work piece side opening of each channel is provided with a window, which is transparent yo thermal radiation.

The fundamental principle of the inventive device is comprised therein, that the thermographic examination of the functional surface occurs from the work tool internal side, through the one or more provided channels. Thereby there is made possible for the first time unimpeded and uninterrupted measurement of the absolute temperatures and two-dimensional temperature distribution of the work piece outer surface directly in the contact area of the work tool-work piece in situ. Thereby the forming process itself can be examined and optimized with respect to the processing parameters, the work tool geometry and the tribo system (material of work tool, work tool coating, lubricant, outer surface topography). The measurements can be carried out not only in the experimental operation, but rather also in be employed series production for dynamic process regulation or feedback control.

The investiture and the costs of the inventive device are small when compared to the application of a measurement field comprised of a plurality of thin layer sensors. Besides this, such a measurement field would only make possible or permit an approximate determination of the spatial temperature distribution, since the thin layer sensors only measure at points.

Depending upon the size of the opening of the channel on the side of the work piece, this may or may not be provided with a window.

In an advantageous embodiment of the inventive device, the work piece side opening of each channel is provided with a window and upon this window a layer or coating or overlay is applied.

Thereby, the determination of the utilization relationship and in particular the employment limits of various work tool coatings under real application conditions is made possible. If IR transparent coatings are employed, for example diamond or similar coatings or overlays, then the contact area of work tool-work piece can be examined in situ. If IR—opaque coatings are employed, then the temperature distribution is first conveyed from the contact area out via conductive paths through the coating to the underside and only thereafter is further relayed by means of thermal radiation in the direction of the temperature measuring device. Work tool coatings are conventionally only a few micrometers thick, thus the warmth conducted through them falsifies the measurement of the temperature distribution only within an acceptable magnitude.

In a further advantageous embodiment of the inventive device, there is over the window, or in place of the window, a covering secured, which is comprised of a tool material conventionally employed in forming processes, for example a chrome-containing tool steel.

The advantage of this embodiment is comprised in the simple, rapid and economical exchangeability of the covering and therewith the tool material and the tool surface.

In a further advantageous embodiment of the inventive device, a coating is applied to the covering.

The advantage of this embodiment is comprised therein, that the covering is easily exchangeable and independent from the rest of the tool, or the measuring device can be coated. This leads to a time and cost saving and makes possible direct or immediate comparative measurements with a basic device. As a result of the comparative measurements, it becomes possible to develop iteratively in the optimizing increments an optimal coating suited for the use for each application case of the forming technique.

Beyond this, the coating—of a conventional tool steel employed in forming processes—allows itself to be coated better and with greater bonding strength with the materials interesting for forming techniques than most of the other outer surfaces, which must withstand the loads during a forming process, for example a diamond outer surface, on which because of the covalent bonding character a sufficient adhesion is achieved. An adequate adhesion is, however, a precondition for temperature measurements over longer periods of time during the forming processes, without suffering from a breaking off of the coating. This makes possible durability testing of the forming process with parallel temperature measurements.

The window situated below the coating supports this superficially, and this prevents a deformation or a breaking of a thin covering on the basis of the loading during the forming process. In the use of coverings with sufficient mechanical load resistance, it becomes possible to dispense with the window.

Generally, a calibration of the device, in particular the temperature-measuring device to the emission characteristics of the material or, as the case may be, the coating, is necessary. The calibration expenditure for various materials or tool coatings can, however, be reduced to a single calibration, in which respectively one coating of a single material conventionally employed in the forming processes is applied over or in place of the window on the channel.

In an advantageous embodiment of this device, the material and the thickness of the coating is so selected, that the image of the temperature distribution of the functional surface (or as the case may be, the lower side of the coating), which via thermal conductivity is directed through the covering, is not adulterated perpendicular to this intended image direction beyond a defined base value.

Since the thermal conduction through the covering occurs not only in the desired direction but rather also perpendicular thereto, the temperature distribution, which can be found at the underside of the covering, in comparison to the temperature distribution which can be found in the contact area of the work tool (covering)—work piece or at the lower side of the (covering) coating, is slightly smeared or attenuated.

In order to be able to determine the influence of a particular covering, the temperature distribution must be measured with and without covering. This can easily be carried out with IR transparent coverings. By investigation of coverings of various materials and thicknesses, both values can be so iteratively optimized with respect to a minimal deviation of the measured and the actual temperature distribution in the coating. A covering optimized in this manner can then be employed for the thermographic examination of various coatings.

Experimental results have shown that the deviation of the measured and the actual temperature distribution in the coating is insignificant when the covering consists of a tool steel 160 CrMoV 12 (German material number: 1.2379) and has a thickness of not more than 300 μm.

In a further advantageous embodiment of this device, the covering is secured by adhesion. This method of securing makes possible a surface-wise and therewith more even securing than for example using screws or clamping. During the forming process, the covering is subjected to loads, which in the case of uneven securing has a greater likelihood of leading to internal tensions and thereby lead to falsification of the images transferred by thermal conductivity of the temperature distribution of the functional surfaces or as the case may be, the coating. Beyond this, screw heads or clamp securing means can, on the basis of the small thickness of the coating, hardly be sunk or counter-sunk into them, whereby the possibilities for their positioning are strongly reduced, since they should not influence the forming process.

Suitable adhesives are, for example, conventionally available two-component adhesives, which are transparent for thermal conductivity and which can for short periods tolerate temperature peaks of up to 500° C. and which can continuously tolerate temperatures of up to 200° C. without critical deterioration of the adhesion.

In a further advantageous embodiment of this device, the window is constructed of a material, which possesses a similar thermal productivity as the covering. Thereby, heat accumulation at the lower side of the covering is avoided, which would falsify the thermographic examination.

Particularly suitable is a diamond or a germanium window. The advantage is comprised therein that these materials on the one hand have a good transparency for thermal radiation and thus are good at conveying the image of the temperature distribution. On the other hand, they possess a good thermal productivity for conducting off the warmth at the lower side of the covering and thus prevent an accumulation of heat.

In a further advantageous embodiment of this device, at least one IR mirror is provided in the channel, for further conveyance of the thermal radiation entering from the work piece side into the channel in the direction of the temperature-measuring device. Many forming tools or benders make possible on the basis of their construction shape and their arrangement during the forming process no straight guide of the channel in their inside. In such cases, one or more IR mirrors make possible the further conveyance of the image of the temperature distribution to the temperature-measuring device.

In an alternative advantageous embodiment of this device, a light guide is provided in the channel for the further conveyance in the direction towards the temperature-measuring device of the thermal radiation entering the channel from the work piece side. It is also possible that the image of the temperature distribution can be conveyed via a light guide through a non-linear channel to the temperature-measuring device.

In a further advantageous embodiment of this device, the temperature-measuring device includes a thermal camera. The advantage thereof is comprised therein, that it makes possible examination of the temperature distribution in a simple and very rapid manner and this both for individual selected point in time (individual image) as well also the development during a longer period of time (sequence of individual images).

In a more special advantageous embodiment of this device, this contains in addition an evaluation device for compensation of IR-losses. Both the window as well as the usually present adhesive layer does not possess a 100% transparency for thermal radiation. This loss factor can be determined independent of the thermographic examination of the forming process, and then during the examination of the forming process (or thereafter) can be compensated for by means of the evaluation unit, such as by computer. The corresponding applies for further measurable and routine (not coincidental) occurring influence parameters.

The task with respect to the process to be achieved for thermographic examination of functional surfaces of forming devices is inventively solved thereby, that the examination occurs during a forming process by means of a temperature-measuring device and that for examination in the forming tool in the area of the functional surface, at least one channel is provided, and this preferably is covered with a thermal radiation transparent window, which leads to the temperature-measurement device, that during the examination the image of the thermal distribution established during the forming process in the functional surface is conveyed to the temperature-measuring device through the window and the channel by means of thermal conductivity.

The advantages of the inventive processes are the same as the advantages already enumerated for the inventive device.

In a further advantageous embodiment of this process, a coating is applied to the window prior to testing, and then the channel is covered with the window.

Thereby, the determination of the employment relationships and in particular the employment limits of various tool coatings under real application conditions are made possible. See the above-corresponding discussion of the device.

In a further advantageous embodiment of this device, a covering is secured over the window or in place of the window, comprised of a tool material conventional in the forming processes.

The advantage of this process step is comprised first therein, that in this manner various tool materials and tool surfaces can be examined, and second in its simple, rapid, and economical manner of employment.

In a further advantageous embodiment of this process, a coating is applied to the covering.

The advantage of this process step is comprised first therein, that with one base device the direct comparative measurements of various coverings is made possible. By means of comparative measurements, a function appropriate optimal covering can be developed iteratively in optimizing increments for each case of application of the forming technique.

In an advantageous embodiment of this process, thermal losses occurring in the path from the covering to the temperature-measuring device are compensated for using a computer. IR-losses necessarily occur in this path. This loss factor can be determined independent of the thermographic examination of the forming process and then during the examination of the forming process (or also thereafter) be compensated via a computer program.

An advantageous method for determining and compensating for the loss factor is comprised therein, that thermographic examination of IR-transparent layers are respectively carried out with and without thermal loss ([with and without window] or [with and without covering and window] or [with and without covering without window]), and that on the basis of these examination results an actual compensation curve can be calculated, and that on the basis of this actual curve the thermal losses during the thermographic examinations of various, that is IR-transparent or IR-opaque layers ([with window and without covering] or [with window and with covering] or [with covering and without window]) can be compensated for by computer program.

BRIEF DESCRIPTION OF THE DRAWINGS

In the following, the inventive device and the inventive process is described in greater detail on the basis of the illustrated embodiments and FIGS. 1 and 2. Therein is shown:

FIG. 1 A preferred embodiment of the inventive device, here especially the so-called strip-pull test, a standard test in the forming technology (1a: from the side; 1b: from the front; 1c sectional enlargement of 1a), and FIG. 2 A preferred embodiment of the wave guide (a tilt or pivot mirror directs IR-irradiation through the channel to the temperature-measuring device).

DETAILED DESCRIPTION OF THE INVENTION

Figure 2:
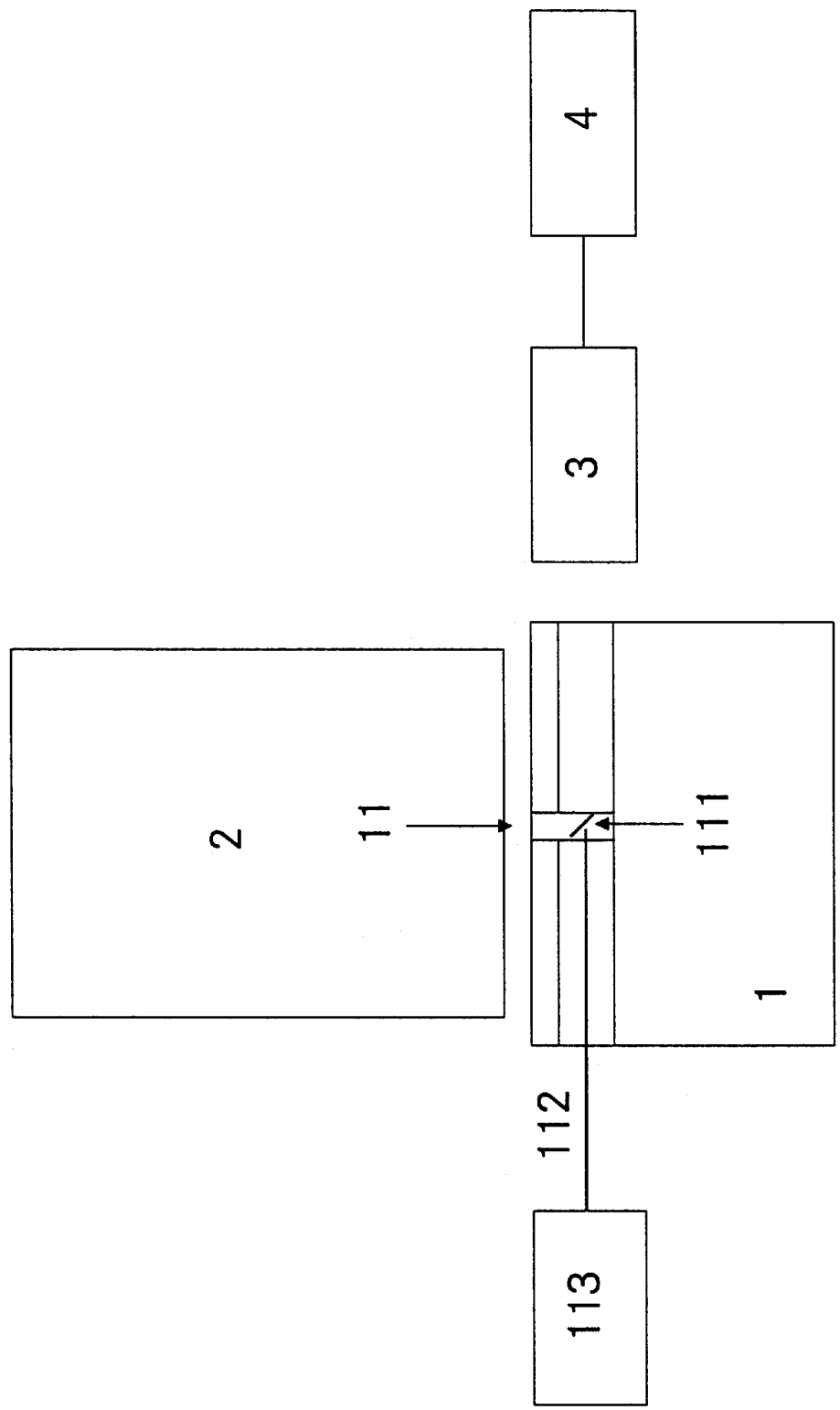

FIG. 1 shows schematically and not according to scale, a device for thermographic examination of functional surfaces of forming tools, comprised of a tool 1 (here the pulling edge in a strip-pull test) which in the area of functional surface 10 exhibits a channel 11 running through the tool 1. The opening of the channel 11 facing the work piece is covered with a window 12. The window 12 is so fitted to the work piece 1 (here: the pulling edge), that it is even with the outer surface of the pulling edge and so offers a flat mounting and support surface for the thereover secured metallic covering 14. The securing is accomplished via an adhesive layer 13 between covering 14 and window 12 or as the case may be upper side of the work piece 1. On the covering 14 a coating 15 to be examined is applied. Over the pull edge a hold-down device 2 can be seen.

FIG. 2 shows in channel 11 an IR-pivot mirror 111 which directs the IR-radiation emitted from the function surface 10 to the temperature-measuring device 3, hereto a thermal camera. An evaluation 4 is connected to this temperature-measuring device 3, here a special measuring computer. The image of the temperature distribution from the underside of the coating or layering 15 is directed through the covering 14 by thermal conductivity to the upper side of the adhesive layer 13, from there via thermal conductivity through the adhesive layer 13 and through the window 12 and then to the channel 11 (redirected via the IR-mirror 111) up to the temperature-measuring device 3. The image recorded by the temperature-measuring device 3 (thermal camera) from the underside of the coating 15 is processed by the evaluation unit 4 in a computer-like manner, so that thermal losses between the coating 15 to the temperature-measuring device 3 are compensated for.

The pivot mirror 111 is pivoted by a pivot device 113 via a mirror carrier 112. This makes possible the moving or displacement of the thermographic image field over the work piece side channel opening and thus also enables the thermographic examination of larger portions of the functional surface 10.

In this embodiment, the coating 14 is comprised of a chrome-containing tool steel 160 CrMoV 12 (German material number: 1.2379), which has a thickness of 300 $\mu$m and covers the entire pull edge. Comparative forming tests with and without covering 14 produce a deviation of the gradient between maximal value and average value of the temperature distribution of approximately 10%.

The window 12 is comprised of CVD-diamond and is quadrilateral with an edge length of 2 mm and a thickness of maximally 500 $\mu$m. The outer surface of the window is adapted to the geometry of the tool. In this embodiment, the window is provided with a radius, which corresponds to the base tool.

The assembly of the window in the tool occurs in suitable manner by adhering in a precisely fitting recess in the tool, which can be produced for example by spark erosion. In this embodiment the window lies in the work tool "like a gulli lid."

The covering 14 is secured upon the window 12 and the outer surface of the work tool 1 by means of an adhesive layer 13 of a conventional, IR-transparent two-component adhesive. Tests have shown, that this securing survives short temperature peaks (approximately 1 second) of up to approximately 500° C. and continuous loads (approximately 20 seconds) of approximately 200° C. without critical impairment of the adhesion or bonding.

In this embodiment, a typical coating 15—titanium nitride in a thickness of 5 $\mu$m—is examined thermographically in situ during the forming: for this it is applied to the covering 14 by conventional deposition methods and then the covering 14 is secured to the tool 1 a pulling edge—by means of the adhesive layer 13 over the diamond window 12. Thereafter the tool 1 is put into use, that is, work pieces are formed over the pull edge. As a result thereof, a characteristic temperature distribution is established in the coating 15, which provides information regarding the loading or stressing and the wear condition of the coating 15. The image of this temperature distribution is conveyed via thermal conductivity through the covering 14 and via thermal radiation through the adhesive layer 13, the diamond window 12 via the mirror 111 to the thermal camera 3. The image received by the thermal camera 3 of the temperature distribution is conveyed further to the evaluation unit 4 in the form of a measuring computer, and there thermal losses, which occur in the path from the coating 15 up to the thermal camera 3, are compensated for in computer-type manner, and further evaluations are undertaken.

The inventive device and the inventive process in the embodiments of the above-described examples have been found to be particularly suitable for a rapid and a simple thermographic examination of various coatings for forming tools with the task of optimizing the wear and the forming relationships of the employed tools.

The invention is not limited to the above-described embodiment, but rather can be applied to further variants.

It is thus envisioned for example that the device and the process are not employed for selection of the optimal coating for a particular forming process with various materials, but rather also to optimize the forming process itself for a given coating material with respect to the technological and physical demand parameters dictated by the work tool geometry and the mechanical settings or with respect to, in certain cases, the employed lubricants. Such a process optimization could at least with respect to the mechanical settings be run continuously by means of a suitable evaluation unit with sufficient high computation power in real time during the forming process.

Particularly in the development of new methods/means of the processing without the utilization of lubricant, of which the employment is associated with high costs and consequences, the temperature provides a critical limitation. Through the employment of this new measurement technique, the temperature development can be resolved not only on absolute terms, but rather also can also be determined (and represented) spatially and temporally, and is available for incremental optimization of the forming process.

Besides this, it is envisioned to dispense with the pivot mirror and to simply conduct the thermal radiation through an air-cooled channel. If for construction technical reasons, the channel should be provided with curves, which prevent a straight beam path, then this can be aided using the light guides, which redirect the thermal rays in the curves.

It is not necessary that the covering be glued to the tool. Also envisioned is a simple overlaying, clamping, or screwing, depending upon which construction technical preconditions need to be taken into consideration, and which mechanical loads are to be expected.

Likewise, the invention can be employed without coating the covering, or also without a window over the channel.

It is further also mentioned that the invention can be employed, besides for the pulling edge described in accordance with the example, also for a various other forming tools.

Besides this, the channel, through which the thermographic examination is to occur, can be provided not only—as shown in the illustrative embodiment—in the pull edge, but rather in the area of each functional surface of various work tools. This means, for the illustrative embodiment of the strip-pulling test, that the channel can be provided in the area of the functional surfaces of the pulling edge and/or the holder and/or a possibly present stencil or dye.

What is claimed is:

1. Device for thermographic examination of functional surfaces (10) of forming tools (1), which includes a temperature-measuring device (3), wherein, the forming tool (1) in the area of the functional surface (10) is provided with at least one channel (11), each channel exhibiting an opening facing the functional surface, and into which channel thermal rays resulting from friction generated at the forming surface are emitted from one of the functional surfaces (10) to be examined and are further conveyed, whereby the thermal rays further conveyed through the channel (11) are at least in part detected by the temperature-measuring device (3), said opening of each channel (11) on the functional surface side is provided with a window (12), which is transparent to thermal radiation.

2. Device according to claim 1, wherein the functional surface side opening of each channel (11) is provided with a window (12), and a coating (15) is applied on each window (12).

3. Device according to claim 1, wherein over the window (12) or in place of the window (12) a covering (14) is secured, comprised of a material conventionally employed in tools used in forming processes.

4. Device according to claim 3, wherein a coating (15) is applied to the covering (14).

5. Device according to claim 3, wherein the material and the thickness of the covering (14) are so selected, that the image of the temperature distribution over the functional surface (10), which via thermal conductivity is propagated through the covering (14), does not deviate in the direction perpendicular to the intended image direction beyond a defined threshold value or limit.

6. Device according to claim 5, wherein the material, of which the covering (14) is comprised, is a chrome-containing tool steel.

7. Device according to claim 5, wherein the thickness of the covering (14) is not greater than 300 $\mu$m.

8. Device according to claim 3, wherein the covering (14) is secured by adhesion, with an adhesive layer (13), which adhesive is transparent to thermal radiation, and which withstands for short periods temperature peaks of up to 500° C. and continuous temperatures of up to 200° C. without substantial deterioration of adhesion.

9. Device as in claim 8, wherein said adhesive is a two-component adhesive.

10. Device according to claim 3, wherein the window (12) is constructed of a material, which possesses a similar thermal conductivity to the covering (14).

11. Device according to claim 10, wherein the window (12) is comprised of diamond or germanium.

12. Device according to claim 1, wherein
the channel (11) is provided with at least one IR-mirror for further directing the thermal radiation entering the channel (11) from the functional surface side toward the direction of the temperature-measuring device (3).

13. Device according to claim 1, wherein
in the channel (11) a light guide (111) is provided, for further directing to the temperature-measuring device (3) the thermal radiation entering the channel (11) from the functional surface side.

14. Device according to claim 1, wherein
the temperature-measuring device (3) includes a thermal camera.

15. Device according to claim 14, wherein said device further contains an evaluation unit (4) for compensating for IR-losses.

16. Device as in claim 1, wherein said opening of each channel (11) is covered by a window (12) which is transparent to thermal radiation.

17. Process for thermographic examination of functional surfaces (10) of forming tools (1),
wherein the examination occurs during the forming process via a temperature-measuring device (3), wherein
before the examination in the forming tool (1) in the area of the functional surface (10) at least one channel (11) is provided,
which preferably is covered with one or more windows (12) transparent for thermal radiation,
which leads to the temperature-measuring unit (3),
during the examination the image of the thermal distribution established on the functional surface (10) during the forming process is directed through the window (12) and the channel (11) by means of thermal radiation to the temperature-measuring unit (3).

18. Process according to claim 17, wherein
each channel is covered over with a thermal radiation transparent window (12), and
prior to the examination a coating (15) is applied upon the window (12).

19. Process according to claim 17, wherein
over the window (12) or
in place of the window (12) a covering (14) is secured,
comprised of a material conventionally employed in tools used in the forming processes.

20. Process according to claim 19, wherein
a coating (15) is applied upon the covering (14).

21. Process according to claim 17, wherein
thermal losses occurring in the path from the functional surface (10) to the temperature-measuring device (3) are compensated for by a computer, preferably in such a manner,
that thermographic examinations of IR-transparent coatings respectively are carried out
on the basis of this investigation result, a calibration curve is calculated,
on the basis of this calibration curve, the thermal losses during the thermographic investigation are compensated.

* * * * *